United States Patent
Hoshiya et al.

(10) Patent No.: US 6,383,114 B1
(45) Date of Patent: May 7, 2002

(54) HYBRID VEHICLE CONTROL APPARATUS HAVING A DEVICE FOR SYNCHRONIZING FRICTION MEMBERS OF ONE OF TWO CLUTCHES CORRESPONDING TO ONE OF TWO DIFFERENT NEUTRAL STATES

(75) Inventors: Kazumi Hoshiya, Gotenba; Hidehiro Oba, Aichi-gun; Hiroatsu Endo, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 8 days.

(21) Appl. No.: 09/679,935

(22) Filed: Oct. 5, 2000

(30) Foreign Application Priority Data

Oct. 8, 1999 (JP) .......................................... 11-288032

(51) Int. Cl.[7] .......................... B60K 5/08; B60K 41/04; B60K 1/00
(52) U.S. Cl. ............................ 477/2; 477/111; 180/652
(58) Field of Search .............................. 475/5; 477/2, 5, 477/6, 12, 29, 181; 180/65.2, 65.3

(56) References Cited

U.S. PATENT DOCUMENTS

| | | | | |
|---|---|---|---|---|
| 5,285,111 A | * | 2/1994 | Sherman | 180/65.2 X |
| 5,337,848 A | * | 8/1994 | Bader | 180/65.2 |
| 5,346,031 A | * | 9/1994 | Gardner | 180/65.2 X |
| 5,495,906 A | * | 3/1996 | Furutani | 180/65.2 |
| 5,569,108 A | * | 10/1996 | Cade'e et al. | 475/1 |
| 5,879,267 A | * | 3/1999 | Desautels et al. | 477/111 |
| 6,176,807 B1 | * | 1/2001 | Oba et al. | 477/5 |
| 6,203,468 B1 | * | 3/2001 | Nitta et al. | 477/5 |
| 6,244,368 B1 | * | 6/2001 | Ando et al. | 477/2 X |
| 6,302,227 B1 | * | 10/2001 | Takemura et al. | 477/3 X |
| 6,306,057 B1 | * | 10/2001 | Morisawa et al. | 475/5 |
| 6,334,498 B1 | * | 1/2002 | Morisawa et al. | 180/65.2 |

FOREIGN PATENT DOCUMENTS

| | | | | |
|---|---|---|---|---|
| EP | 1090792 | * | 4/2001 | 475/5 |
| JP | 10-304513 | | 11/1998 | |
| JP | 11-127502 | | 5/1999 | |

* cited by examiner

Primary Examiner—Charles A Marmor
Assistant Examiner—Roger Pang
(74) Attorney, Agent, or Firm—Kenyon & Kenyon

(57) ABSTRACT

An apparatus for controlling a hybrid vehicle with a power transmitting system including a transmission and a planetary gear device having a first rotary element connected to a first drive power source such as an engine, a second rotary element connected to a second drive power source and to the transmission through a first clutch, and a third rotary element connected to the transmission through a second clutch, the apparatus including a neutral-mode determining device operable when the first and second clutches are in a released state, for determining whether the power transmitting system is placed in a first or a second neutral state, depending upon which one of the first and second clutches is to be engaged when a driving of the hybrid vehicle is subsequently initiated, a first synchronizing device operable when the power transmitting system is placed in the first neutral state, for synchronizing speeds of a pair of friction members of the first clutch with each other, and a second synchronizing device operable when the power transmitting system is placed in the second neutral state, for synchronizing speeds of a pair of friction members of the second clutch with each other.

10 Claims, 9 Drawing Sheets

| SHIFT LEVER POSITION | MODE | | ENGAGED (○) OR RELEASED (×) | | |
|---|---|---|---|---|---|
| | | | C1 | C2 | B1 |
| B,D | ETC MODE | | × | ○ | × |
| | DIRECT MODE | | ○ | ○ | × |
| | MOTOR DRIVE MODE | | ○ | × | × |
| N,P | NEUTRAL MODES | NON-CHARGING MODE | × | × | × |
| | | CHARGING & ENGINE-START MODE | × | × | ○ |
| R | MOTOR DRIVE MODE | | ○ | × | × |
| | FRICTION DRIVE MODE | | ○ | × | ○ |

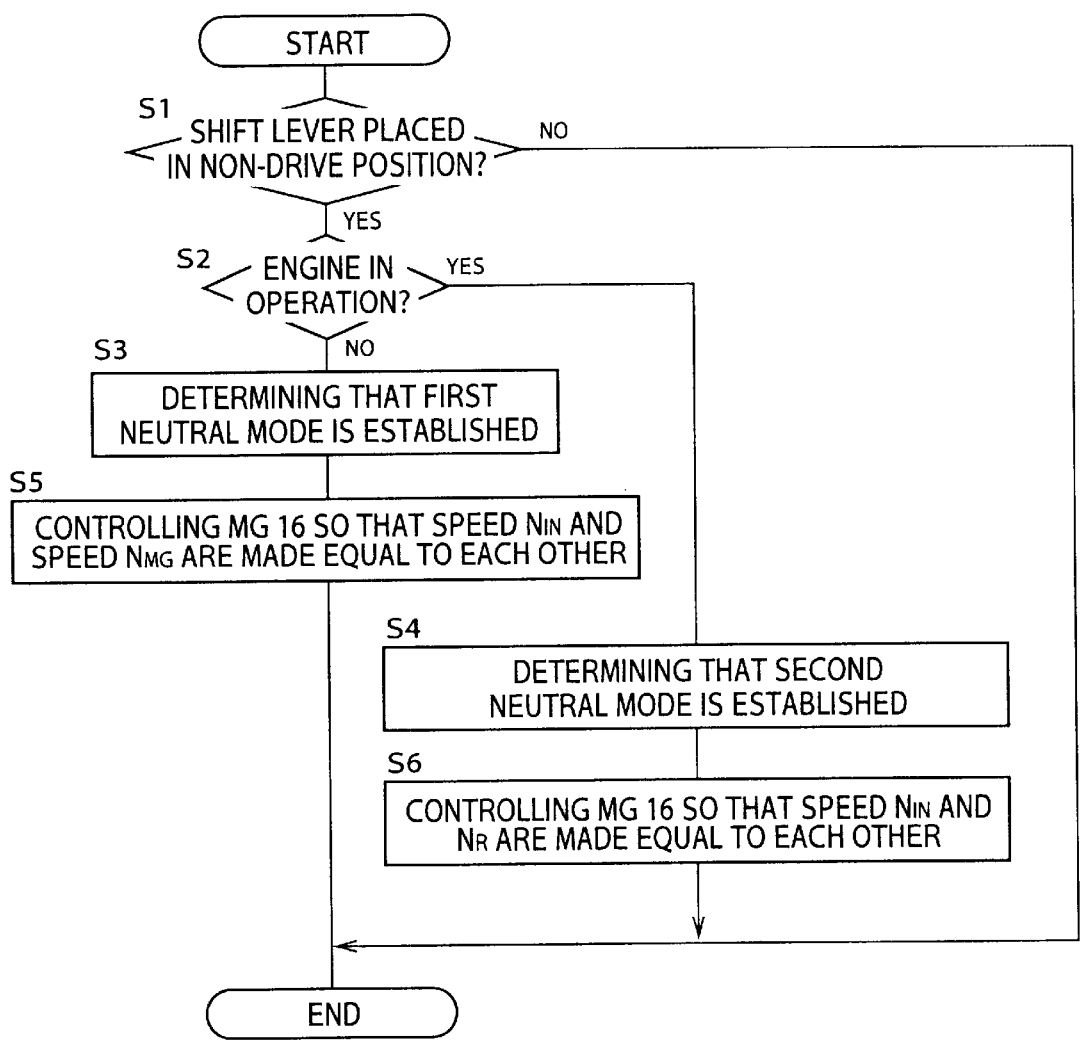

HYBRID VEHICLE CONTROL APPARATUS HAVING A DEVICE FOR SYNCHRONIZING FRICTION MEMBERS OF ONE OF TWO CLUTCHES CORRESPONDING TO ONE OF TWO DIFFERENT NEUTRAL STATES

This application is based on Japanese Patent Application No. 11-288032 filed Oct. 8, 1999, the contents of which are incorporated hereinto by reference.

BACKGROUND OF THE INVENTION

1. Field of the Invention

The present invention relates to a control apparatus for controlling a hybrid automotive vehicle, and more particularly to technologies for reducing a control delay and a shock upon switching of an operating mode of such a hybrid vehicle from a neutral mode to a drive mode.

2. Discussion of Related Art

There is known a hybrid automotive vehicle including an internal combustion engine, an electric motor, a transmission, and a clutch device disposed between the internal combustion engine and electric motor and the transmission. Such a hybrid vehicle has an engine drive mode in which a drive force generated by the internal combustion engine is selectively transmitted to the transmission through the clutch device, a motor drive mode in which a drive force generated by the electric motor is transmitted to the transmission through the transmission, a regenerative braking mode in which the electric motor is driven by a kinetic energy of the vehicle to produce a regenerative braking torque, and an engine-start mode in which the internal combustion engine is started by the electric motor. An example of such a hybrid vehicle is disclosed in JP-A-11-127502.

When the operating mode of the known hybrid vehicle indicated above is switched from the neutral mode to the drive mode (the motor drive mode or engine drive mode), the clutch device is brought to its engaged state only after the clutch elements have been synchronized, so that the drive force can be smoothly transmitted to the electric motor or internal combustion engine to the transmission, without an engaging shock of the clutch device.

The synchronization of the clutch elements upon switching of the operating mode requires and causes some delay time before the completion of the engaging action of the clutch device, making it difficult to achieve a rapid switching of the operating mode with a high operational response.

SUMMARY OF THE INVENTION

The prevent invention was made in view of the background prior art discussed above. It is therefore an object of the present invention to provide a control apparatus for controlling a hybrid automotive vehicle, which control apparatus assures a high operational response upon switching of the operating mode of the vehicle.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A vehicle control apparatus for controlling a hybrid vehicle of a type which comprises a first drive power source, a second drive power source, and a power transmitting system including a transmission and a planetary gear device having a first rotary element connected to the first drive power source, a second rotary element connected to the second drive power source and further connected to the transmission through a first clutch, and a third rotary element connected to the transmission through a second clutch, the first clutch including one pair of friction members connected to the first rotary member and the transmission, respectively, the second clutch including one pair of friction members connected to the third rotary element and the transmission, respectively, the vehicle control apparatus further comprising:

neutral-mode determining means operable when the first and second clutches are both placed in a released state, for determining whether the power transmitting system is placed in a first neutral state or a second neutral state, depending upon which one of the first and second clutches is to be engaged when a driving of the hybrid vehicle in a vehicle drive mode is subsequently initiated;

first synchronizing means operable when the neutral-mode determining means has determined that the power transmitting system is placed in the first neutral state, for synchronizing speeds of the one pair of friction members of the first clutch with each other; and second synchronizing means operable when the neutral-mode determining means has determined that the power transmitting system is placed in the second neutral state, for synchronizing speeds of the one pair of friction members of the second clutch with each other.

In the vehicle control apparatus constructed according to the above mode (1) of this invention, the first synchronizing means is operated when the neutral-mode determining means has determined that the power transmitting system is placed in the first neutral state. The first synchronizing means is adapted to synchronize the speeds of the friction members of the first clutch which is to be engaged when the driving of the vehicle in a drive mode is subsequently initiated while the power transmitting system is placed in the first neutral state. The second synchronizing means is operated when the neutral-mode determining means has determined that the power transmitting system is placed in the second neutral mode. The second synchronizing means is adapted to synchronize the speeds of the friction members of the second dutch which is to be engaged when the driving of the vehicle is subsequently initiated while the power transmitting system is placed in the second neutral state. Owing to the speed synchronization of the friction members of the first or second clutch which is to be engaged upon subsequent initiation of the vehicle driving in an appropriate drive mode while the power transmitting system is placed in the corresponding first or second neutral state, the appropriate drive mode can be rapidly established with a high operational response, and with a reduced shock due to an engaging action of the appropriate clutch.

(2) A vehicle control apparatus according to the above mode (1), wherein the first synchronizing means synchronizes the speeds of the one pair of friction members of the first clutch, by controlling an operating speed of the second drive power source.

(3) A vehicle control apparatus according to the above mode (1) or (2), wherein t he second synchronizing means synchronizes the speeds of the one pair of friction members of the second clutch, by controlling an operating speed of the second drive power source.

In the vehicle control apparatus according to the above mode (2) or (3), the speeds of the friction members of the first or second clutch are synchronized by the corresponding first or second synchronizing means by utilizing a rotary motion of the second drive power source, rather than a rotary motion of the first drive power source, so that the synchronization of the clutch can be achieved over a comparatively wide range of the operating speed of the input shaft of the transmission.

(4) A vehicle control apparatus according to any one of the above modes (1)–(3), wherein the hybrid vehicle has a front wheel and a rear wheel, and further comprises a third drive power source, and wherein one of the front and rear wheels is connected to the first drive power source and the second drive power source through the transmission, and the other of the front and rear wheels is connected to the third drive power source, the third drive power source generating a signal representative of a rotating direction of the other wheel, while the third drive power source is not operated to apply a driving torque to the other wheel, the first synchronizing means synchronizing the speeds of the one pair of friction members of the first clutch, on the basis of the rotating direction of the other wheel represented by the signal.

(5) A vehicle control apparatus according to any one of the above modes (1)–(4), wherein the hybrid vehicle has a front wheel and a rear wheel, and further comprises a third drive power source, and wherein one of the front and rear wheels is connected to the first drive power source and the second drive power source through the transmission, and the other of the front and rear wheels is connected to the third drive power source, the third drive power source generating a signal representative of a rotating direction of the other wheel, while the third drive power source is not operated to apply a driving torque to the other wheel, the second synchronizing means synchronizing the speeds of the one pair of friction members of the second clutch, on the basis of the rotating direction of the other wheel represented by the signal.

In the vehicle control apparatus according to the above mode (4) or (5), the first or second synchronizing means synchronizes the speeds of the friction members of the corresponding first or second clutch, on the basis of the detected direction of rotation of the wheel connected to the third drive power source. Accordingly, the operating mode of the vehicle can be switched from the neutral state to the appropriate vehicle drive mode, with high stability, irrespective of whether the vehicle is driven in the forward or reverse direction.

(6) A vehicle control apparatus according to any one of the above modes (1)–(5), wherein a drive force generated by the second drive power source is transmitted to the transmission through the first clutch placed in its engaged state, during the driving of the hybrid vehicle in the vehicle drive mode when the driving in the vehicle drive mode is initiated while the first drive power source is at rest, and a drive force generated by the first drive power source is transmitted to the transmission through the second clutch placed in its engaged state, during the driving of the hybrid vehicle in the vehicle drive mode when the driving in the vehicle drive mode is initiated while the first drive power source is in operation, the neutral-mode determining means includes:

operation determining means for determining whether the first drive power source is in operation or at rest;

first-neutral-state determining means for determining that the power transmitting system is placed in the first neutral state, when the operation determining means has determined that the first drive power source is at rest; and second-neutral-state determining means for determining that the power transmitting system is placed in the second neutral state, when the operation determining means has determined that the first drive power source is in operation.

In the apparatus according to the above mode (6), the neutral-mode determining means, which is operated while the first and second clutches are both placed in the released state, is arranged to determine whether the power transmitting system is placed in the first neutral state or in the second neutral state, depending upon whether the first drive power source is at rest or in operation. This arrangement assures accurate determination as to whether the power transmitting system in the first neutral state or in the second neutral state. When the driving of the vehicle is initiated in the first neutral state in which the first drive power source is at rest, the first clutch is engaged to establish the vehicle drive mode, so that the drive force is transmitted from the second drive power source to the transmission through the engaged first clutch. When the driving is initiated in the second neutral state in which the first drive power source is in operation, the second clutch is engaged to establish the vehicle drive mode, so that the drive force is transmitted from the first drive power source to the transmission through the engaged second clutch.

(7) A vehicle control apparatus according to the above mode (6), wherein the hybrid vehicle has an operator-controlled member having a least one vehicle-drive position in which the hybrid vehicle is driven by at least one of the first drive power source and the second drive power source, and at least one non-vehicle-drive position in which the first and second clutches are placed in the released state and the hybrid vehicle is driven by none of the first drive power source and the second drive power source, said neutral-mode determining means being operable when the operator-controlled member is placed in the non-vehicle-drive position.

(8) A vehicle control apparatus according to any one of the above modes (1–7), wherein the first drive power source is an internal combustion engine, and the second drive power source is a motor/generator.

(9) A vehicle control apparatus according to the above mode (4) or (5), wherein the first drive power source is an internal combustion engine, and the second and third drive power sources are a first motor/generator and a second motor/generator, respectively.

BRIEF DESCRIPTION OF THE INVENTION

The above and other objects, features, advantages and technical and industrial significance of the present invention will be better understood by reading the following detailed description of a presently preferred embodiment of the invention, when considered in connection with the accompanying drawings, in which.

Figure 1:
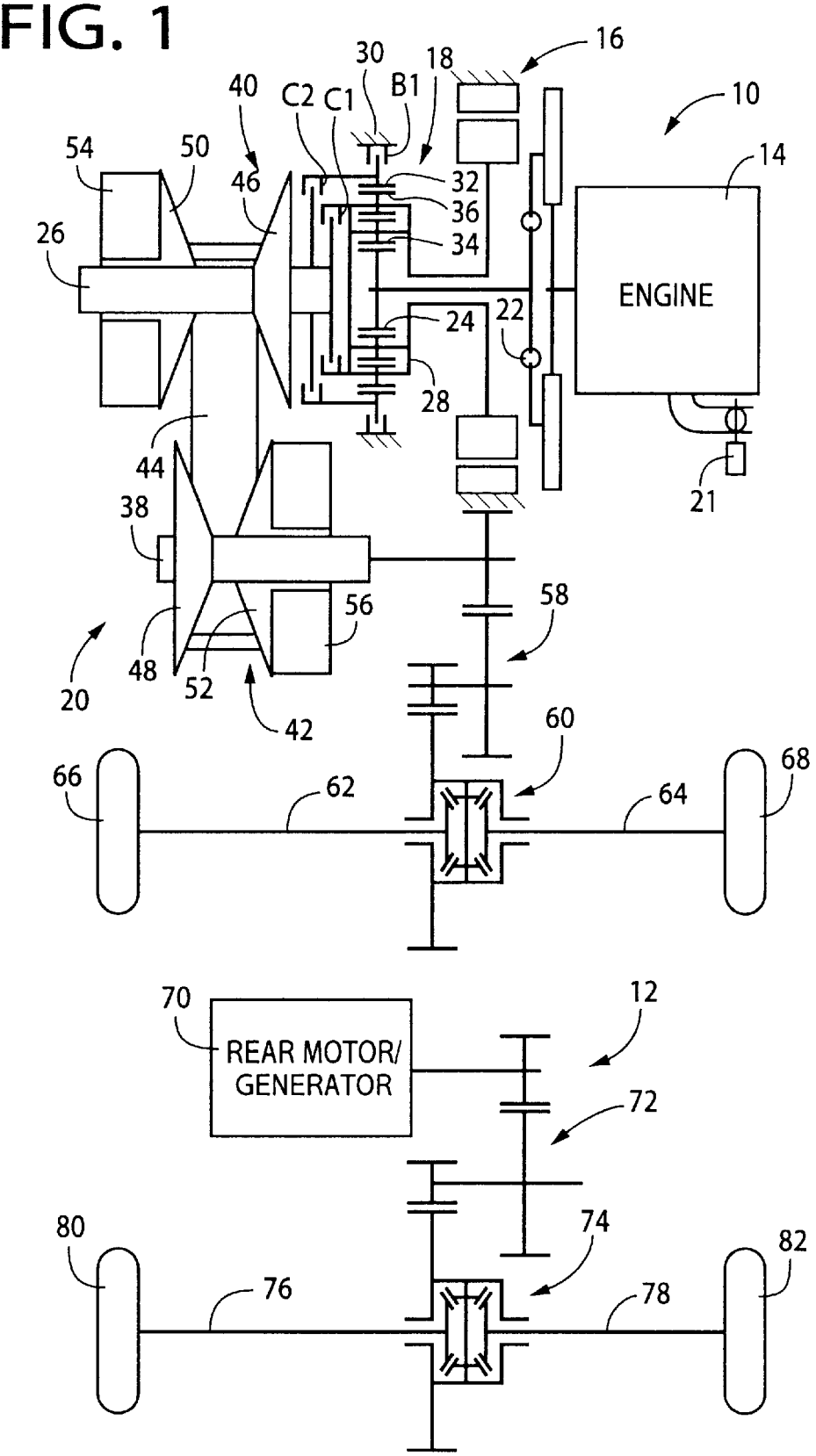
FIG. 1 is a schematic view showing an arrangement of a power transmitting system of a four-wheel-drive vehicle equipped with a control apparatus constructed according to one embodiment of this invention.
Figure 6:
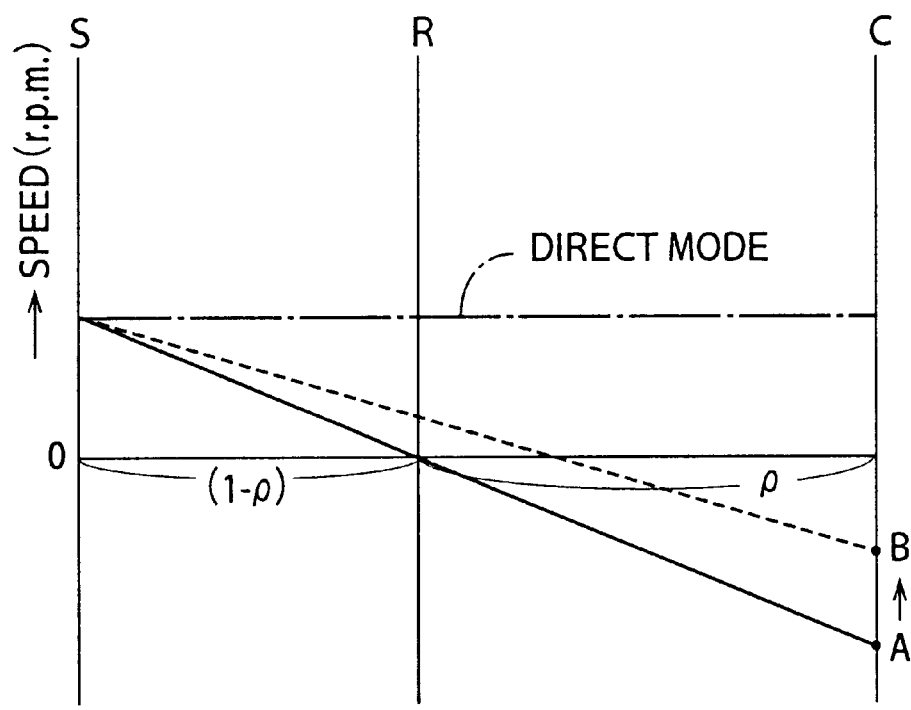
Figure 7:
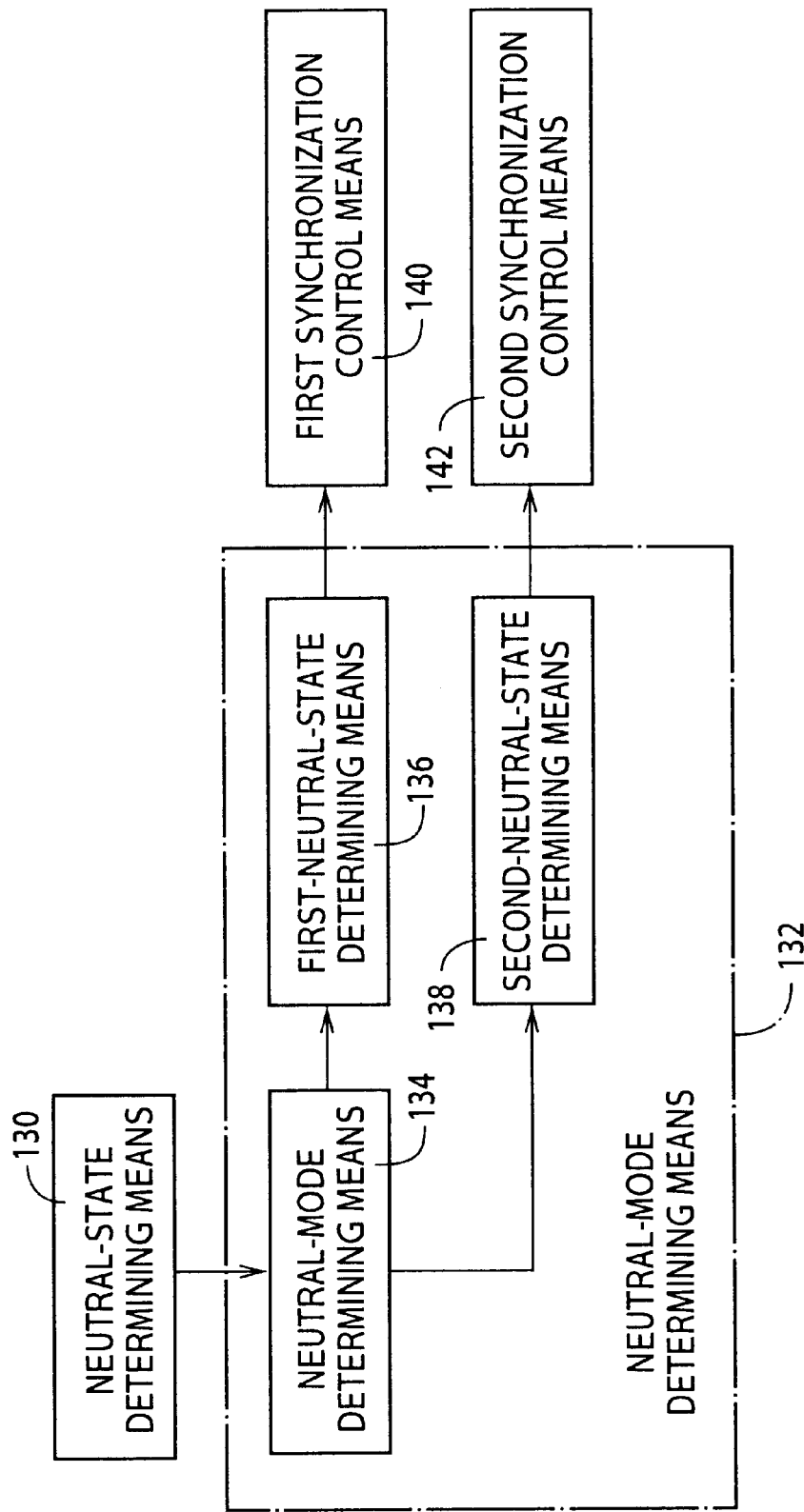
Figure 8:
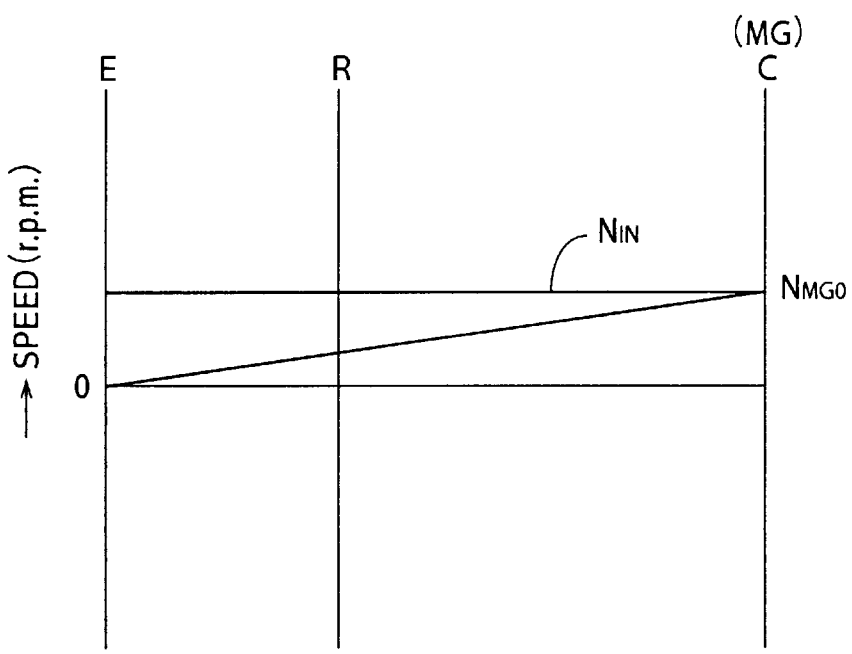
Figure 9:
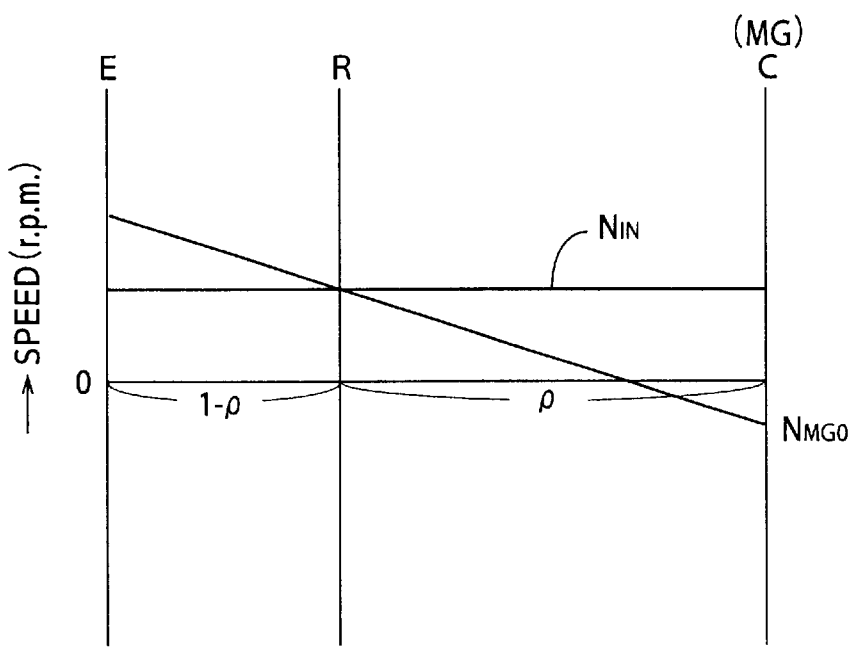
Figure 10:
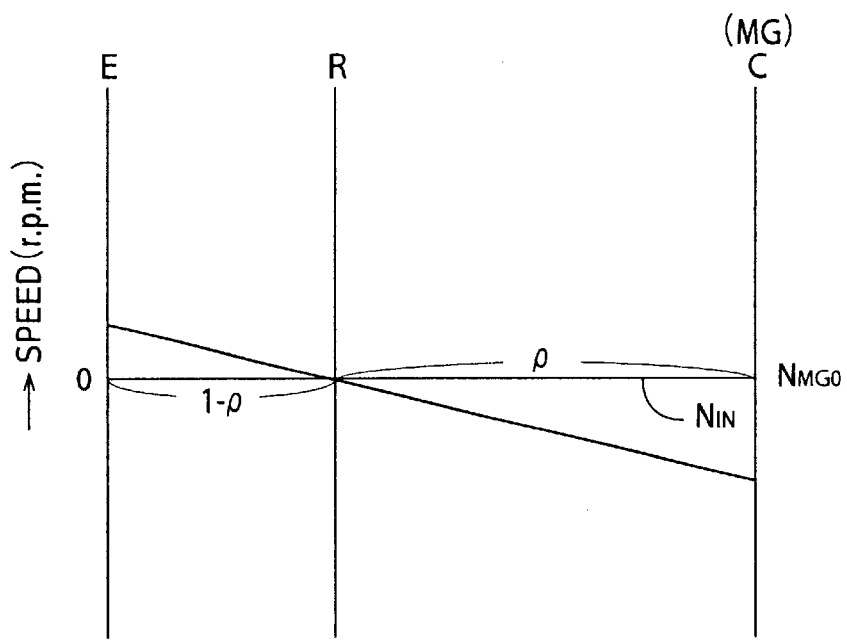
Figure 11:
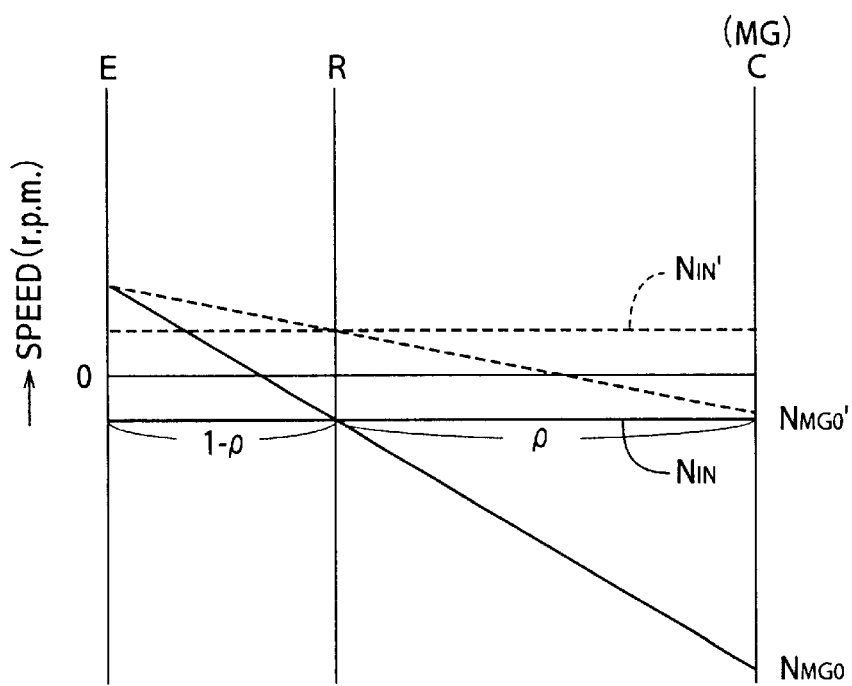

FIG. 6 is a collinear chart wherein axes S, R and C indicative of the respective speeds of sun gear, ring gear and carrier of the planetary gear device shown in FIG. 1 extend in the vertical direction, while an axis indicative of the speed ratio of the planetary gear device extends in the horizontal direction, the collinear chart showing the rotating speeds of the rotary elements of the planetary gear device in DIRECT mode and TC mode:

FIG. 7 is a block diagram indicating functional means of the hybrid control device for controlling an operation of a motor/generator 16 (MG 16);

FIG. 8 is a collinear chart having vertical and horizontal axes similar to those of FIG. 6, showing speed $N_{MG}$ of the MG 16 synchronized with speed $N_{IN}$ the input shaft of a continuously variable transmission when an engine is at rest;

FIG. 9 is a collinear chart having vertical and horizontal axes similar to those of FIG. 6, showing speed $N_R$ of the ring gear which is made equal to the input shaft speed $N_{IN}$ when the engine is in operation while the vehicle is running forward;

FIG. 10 is a collinear chart having vertical and horizontal axes similar to those of FIG. 6, showing the ring gear speed $N_R$ which is made equal to the input shaft speed $N_{IN}$ when the engine is started while the vehicle is stationary;

FIG. 11 is a collinear chart having vertical and horizontal axes similar to those of FIG. 6, showing the ring gear speed $N_R$ which is made equal to the input shaft speed $N_{IN}$ when the engine is started while the vehicle is running rearward; and FIG. 12 is a flow chart illustrating a control routine executed by the hybrid control device to control the operation of the MG 16.

DETAILED DESCRIPTION OF THE PREFERRED EMBODIMENTS

Referring first to the schematic view of FIG. 1, there is shown an arrangement of a power transmitting system in a four-wheel-drive hybrid vehicle having front and rear drive wheels, which is provided with a control apparatus according to the principle of this invention. This four-wheel-drive vehicle has a plurality of drive devices, namely, a first drive device in the form of a main drive device 10 including a first drive unit for driving the front drive wheels, and a second drive device in the form of an auxiliary drive device 12 including a second drive unit for driving the rear drive wheels.

The main drive device 10 includes an engine 14, a motor/generator 16 (hereinafter abbreviated as "M/G16"), a planetary gear device 18 of double-pinion type, and a continuously variable transmission 20, which are arranged coaxially with each other. The engine 14 is an internal combustion engine operated by combustion of an air-fuel mixture, and the M/G 16 selectively functions as an electric motor or an electric generator. The continuously variable transmission 20 is operated so as to continuously change its speed ratio. As indicated above, the engine 14 functions as the first or main drive unit, and is provided with a throttle actuator 21 for operating a throttle valve provided for controlling a quantity of intake air that is introduced into an intake pipe, more specifically, for controlling an angle of opening $\theta_{TH}$ of the throttle valve.

The planetary gear device 18 is a synthesizing/distributing mechanism constructed to mechanically synthesize forces or distributing a force, and includes three rotary elements that are rotatable about a common axis, that is, a first rotary element in the form of a sun gear 24, a second rotary element in the form of a carrier 28 and a third rotary element in the form of a ring gear 32. The sun gear 24 is connected to the engine 14 through a damper 22, and the carrier 28 is connected to an input shaft 26 of the continuously variable transmission 20 through a first clutch C1 and to an output shaft of the motor/generator. The ring gear 32 is connected to the input shaft 26 of the continuously variable transmission 20 through a second clutch C2 and to a stationary member in the form of a housing 30 through a brake B1. The carrier 28 supports a pair of pinions (planetary gears) 34, 36 which mesh with each other and with the sun gear 24 and the ring gear 32, such that the pinions 34, 36 are rotatable about their axes, respectively. Each of the first and second clutches C1, C2 and the brake B1 is a hydraulically operated frictional coupling device including a plurality of mutually superposed friction members in the form of friction plates and a hydraulic actuator for forcing the friction plates against each other and releasing the friction plates away from each other. The clutch or brake C1, C2, B1 is engaged when the friction plates are forced against each other, and is released when the friction plates are released away from each other.

The planetary gear device 18 cooperates with the M/G 16 connected to the carrier 28, to constitute an electric torque converter (ETC) adapted to gradually increase the amount of electric energy to be generated by the M/G 16 during an operation of the engine 14, that is, during rotation of the sun gear 24, so as to gradually increase the drive torque of the M/G 16 or the reaction force of the carrier 28, for thereby gradually or smoothing increasing the rotating speed of the ring gear 32 so as to permit smooth starting of the vehicle. If the gear ratio of the planetary gear device 18, which is a ratio of the number of teeth of the un gear 24 to the number of teeth of the ring gear 32, is represented by ρ, there exists the following relationship among a torque value $T_R$ of the ring gear 32, a torque value $T_C$ of the carrier 28 and a torque value $T_S$ of the sun gear 24:

$$T_R:T_C:T_S=1/\rho:(1=\rho)/\rho:1$$

Where the gear ratio ρ is equal to 0.5 as in an ordinary planetary gear device, the torque of the engine 14 is boosted to 1/ρ, that is, two times, before it is transmitted to the continuously variable transmission. Thus, the vehicle is placed in a torque boosting mode (electric torque converter or ETC mode) while the electric torque converter (ETC) is in operation.

The continuously variable transmission 20 has a pair of variable-diameter pulleys 40, 42 that are mounted on the input shaft 26 and an output shaft 38, respectively, and a transmission belt 44 connecting these pulleys 40, 42. As described below, the effective diameters of the pulleys 40, 42 can be changed continuously. The pulleys 40, 42 include respective stationary rotary members 46, 48 fixed on the input shaft 26 and an output shaft 38, respectively, and respective movable rotary members 50, 52 mounted on the input and output shafts 26, 38, respectively such that the movable rotary members 50, 52 are axially movable relative to the respective input and output shafts 26, 38 and are rotated with these shafts 26, 38. The movable rotary members 50, 52 cooperate with the respective stationary rotary members 46, 48 to define V-grooves therebetween. The pulleys 40, 42 further include respective hydraulic cylinders 54, 56 adapted to axially move the respective movable rotary members 50, 52 relative to the input and output shafts 26, 38, for thereby changing the effective diameters of the variable-diameter pulleys 40, 42, so that a speed ratio γ of the continuously variable transmission 20 can be changed. The speed ratio γ is a ratio of the rotating speed of the input shaft 26 to the rotating speed of the output shaft 38.

The output torque of the continuously variable transmission 20 is transmitted from its output shaft 38 to a pair of front wheels 66, 68 through a speed reducing device 58, a differential gear device 60, and a pair of front axles 62, 64. In FIG. 1, a steering device for changing the steering angle of the front wheels 66, 68 is not shown. It will be understood that the power transmitting system of the present hybrid vehicle includes the planetary gear device 18, continuously variable transmission 20 and speed reducing device 58 and differential gear device 60.

The auxiliary drive device 12 includes a rear motor/generator 70 (hereinafter abbreviated as "RMG 70") that functions as the second or auxiliary drive unit. The output torque of the RMG 70 is transmitted to a pair of rear wheels 80, 82 through a speed reducing device 72, a differential gear device 74 and a pair of rear axles 76, 78.

Figure 2:
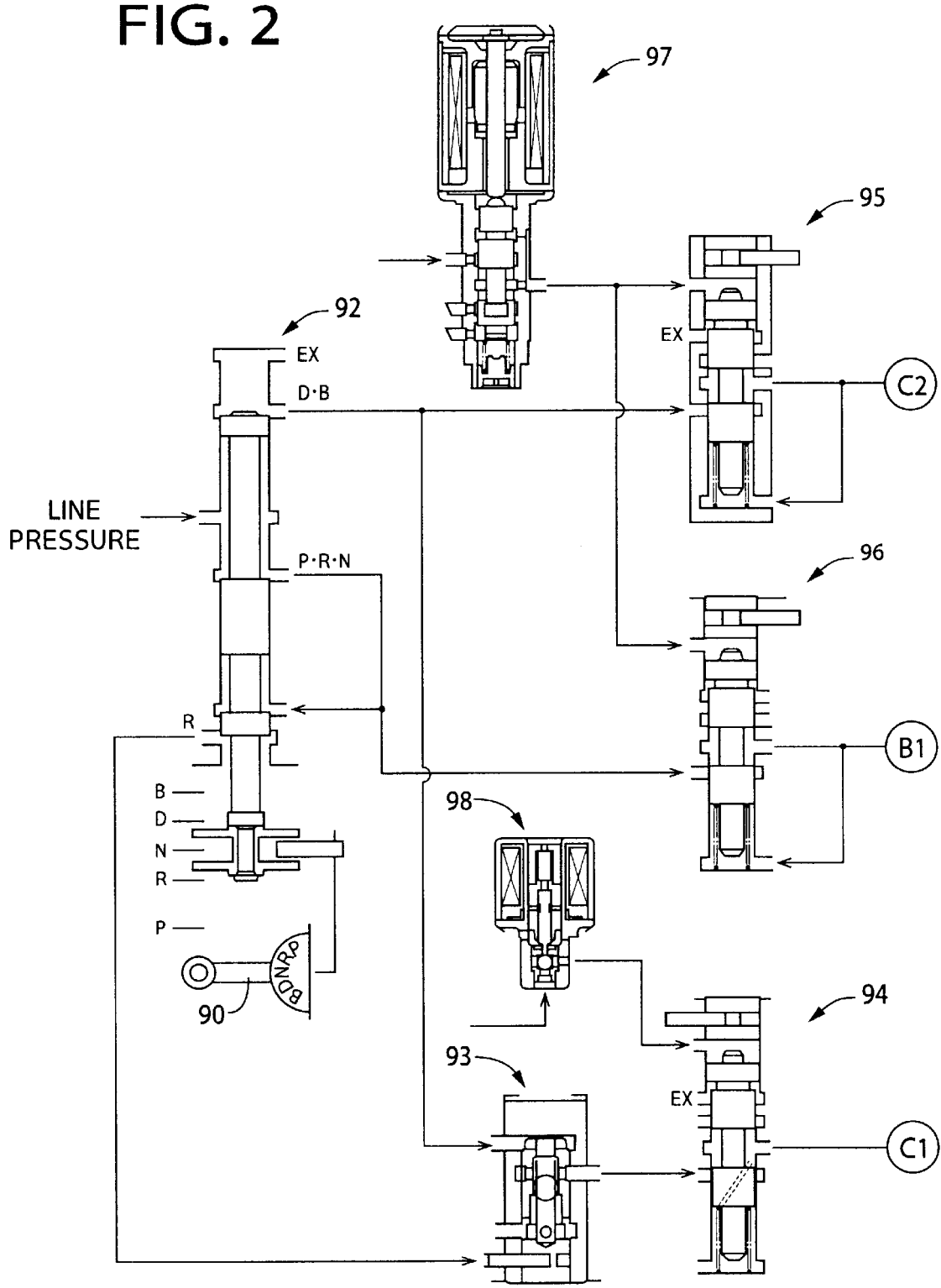
FIG. 2 is a view showing a portion of a hydraulic control device for controlling a planetary gear device used in the power transmitting system of FIG. 1.

Referring to FIG. 2, there is illustrated an arrangement of a hydraulic control device adapted to selectively establish various operating modes of the planetary gear device 18 of the main drive device 10. The hydraulic control device includes a manual valve 92 mechanically connected to a shift lever 90 which is operated by the vehicle operator to a selected one of five operating positions P, R, N, D and B. The manual valve 92 is adapted to receive a line pressure generated by an oil pump (not shown), and apply the line pressure to a selected one of a first pressure-regulating valve 94, a second pressure-regulating valve 95 and a third-pressure regulating valve 96, depending upon the currently selected position of the shift lever 90. Namely, when the shift lever 90 is placed in one of the operating positions D, B and R, the manual valve 92 applies the line pressure through a shuttle valve 93 to the first pressure-regulating valve 94 for regulating an engaging pressure of the first clutch C1. When the shift lever 90 is place in one of the operating positions D and B, the manual valve 92 applies the line pressure to the second pressure-regulating valve 95 for regulating an engaging pressure of the second clutch C2. When the shift lever 90 is placed in one of the operating positions N, P and R, the manual valve 92 applies the line pressure to the third pressure-regulating valve 96 for regulating an engaging pressure of the brake B1. The second and third pressure-regulating valves 95, 96 are adapted to receive a pilot pressure from a linear solenoid valve 97 controlled by a hybrid control device 104, for controlling the engaging pressures of the second clutch C2 and the brake B1. On the other hand, the first pressure-regulating valve 94 is adapted to receive a pilot pressure from a three-way valve in the form of a solenoid-operated shut-off valve 98 controlled by the hybrid control device 104, for controlling the engaging pressure of the first clutch C1. The duty cycle or ratio of the shut-off valve 98 is controlled by the hybrid control device 104.

Figure 3:
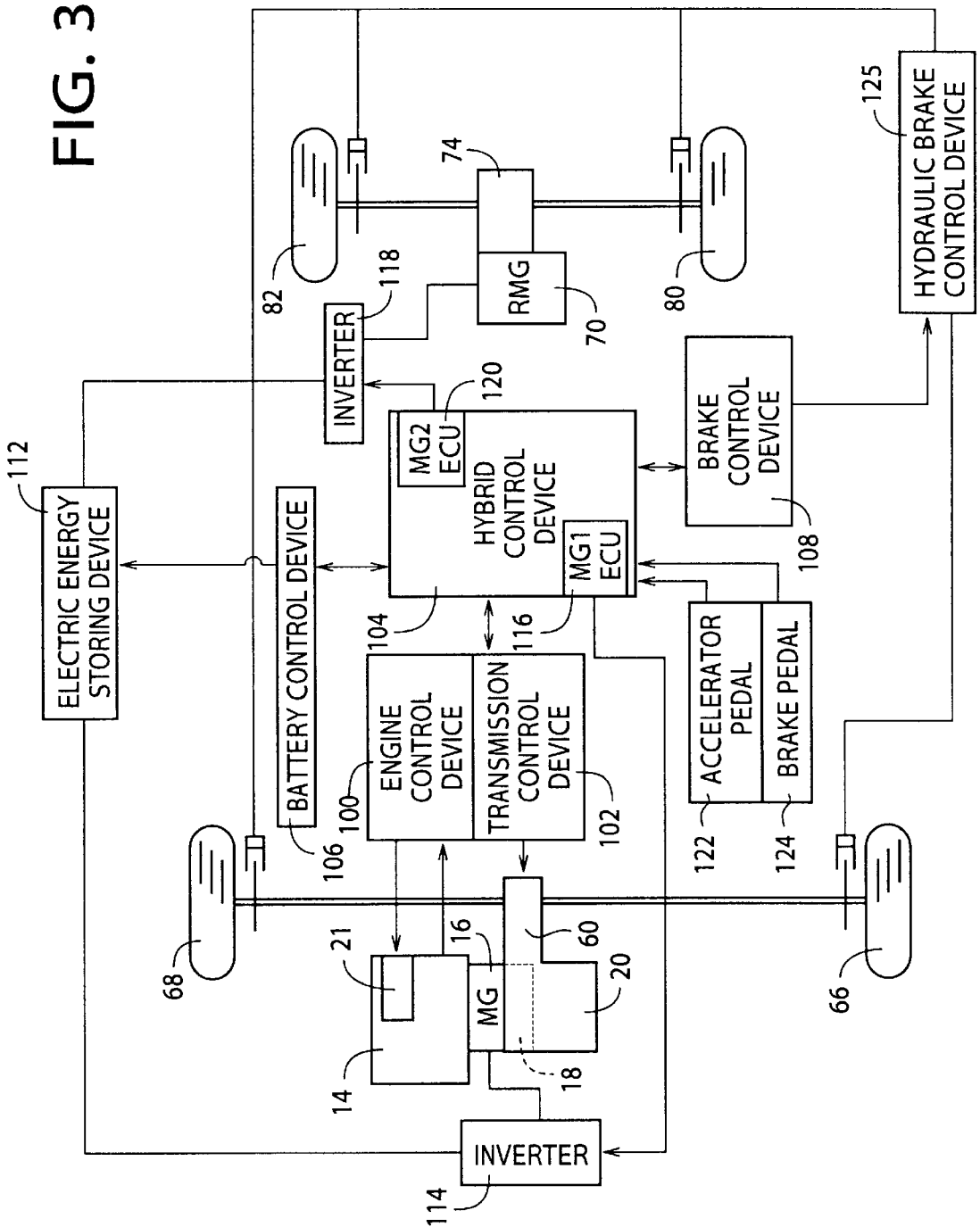
FIG. 3 is a view illustrating various control devices provided for the four-wheel-drive vehicle of FIG. 1.

Reference is now made to FIG. 3, there are illustrated various control devices of a control apparatus provided for the four-wheel-drive vehicle of FIG. 1. The vehicle control apparatus includes an engine control device 100, a transmission control device 102, the hybrid control device 104 indicated above, a battery control device 106 and a brake control device 108. Each of these control devices 100, 102, 104, 106, 108 is a so-called microcomputer incorporating a central processing unit (CPU), a random-access memory (RAM), a read-only memory (ROM), and an input/output interface. The CPU processes input signals according to control programs stored in the ROM while utilizing a temporary data storage function of the RAM, for performing various controls of the vehicle. The control devices 100–108 are capable of effecting data communications with each other, such that appropriate signals requested by one of the control devices are transmitted from another control device in response to a request received from the above-indicated one control device.

The engine control device 100 effects various controls of the engine 14, such as a fuel injection control for controlling a fuel injection valve so as to control the amount of fuel to be injected into the engine 14, an ignition timing control for controlling an igniter for controlling the ignition timing, and a traction control for controlling the throttle actuator 21 to temporarily reduce the output of the engine 14 so that the slipping tendency of the front drive wheels 66, 68 is reduced to enable the front drive wheels 66, 68 to have a sufficient road-surface gripping force, that is, to generate a sufficient vehicle traction force.

The transmission control device 102 is adapted to hold the tension of the transmission belt 44 at an optimum value and control the speed ratio γ of the continuously variable transmission 20. Described more specifically, the transmission control device 102 controls a pressure-regulating valve provided for adjusting the tension of the transmission belt 44, on the basis of the presently established speed ratio γ and the actual transmission torque of the transmission 20 (namely, the output torque of the engine 14 and the MG 16), and according to a predetermined relationship among the tension of the belt 44 and the speed ratio and transmission torque of the transmission 20. This relationship, which is stored in the ROM of the transmission control device 102, is formulated so as to optimize the belt tension. For controlling the speed ratio γ of the transmission 20, the transmission control device 102 determines a desired speed ratio value γ*, on the basis of the actual vehicle running speed V and the actual load on the engine 14 (as represented by the opening angle $\theta_{TH}$ of the throttle valve or the operating amount $A_{CC}$ of an accelerator pedal 122), and according to a predetermined relationship among the desired speed ratio value γ* and the vehicle running speed V and engine load. This relationship, which is also stored in the ROM, is formulated to permit the engine 14 to operate according to a minimum fuel consumption curve or a maximum efficiency curve.

Figures 4, 5:
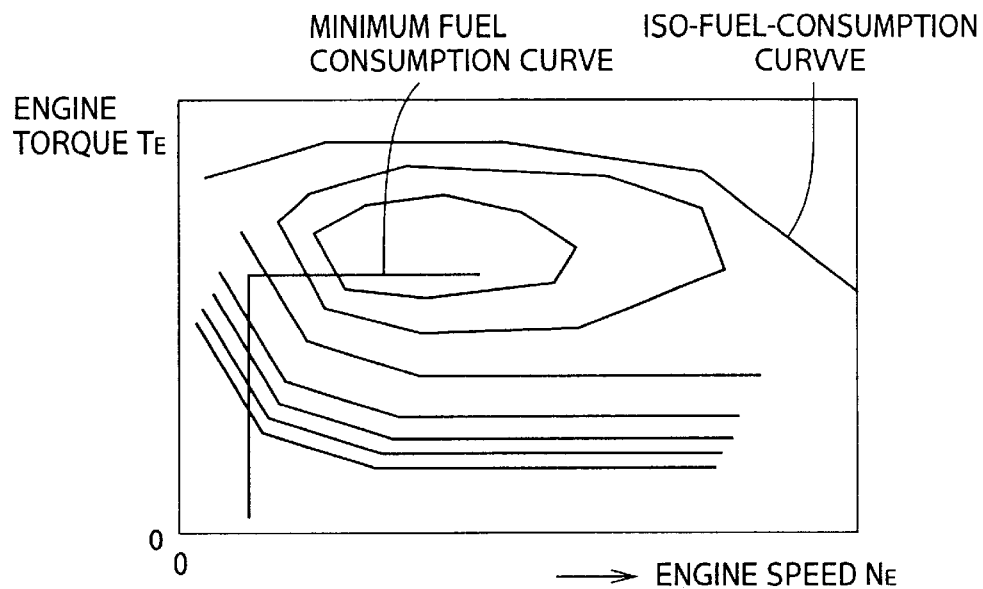
FIG. 4 is a graph showing maximum fuel economy lines for explaining operations of an engine control device and a transmission control device shown in FIG. 3.
FIG. 5 is a view showing various vehicle operating modes selected by a hybrid control device shown in FIG. 3.

For instance, the engine control device 100 and the transmission control device 102 control the throttle actuator 21, the fuel injection valve and the speed ratio γ of the continuously variable transmission 20, so that the engine 14 is operated such that the operating state of the engine 14 as represented by its output torque $T_E$ and speed $N_E$ follows the maximum fuel economy lines indicated in FIG. 4. Further, the engine control device 100 and the transmission control device 102 controls the throttle actuator 21 and the speed ratio γ so as to change the output torque $T_E$ and speed $N_E$ of the engine 14 according to a control command received from the hybrid control device 104.

The hybrid control device 104 includes a first motor/generator control device 116 (MG1 ECU) for controlling an inverter 114, and a second motor/generator control device 120 (MG2 ECU) for controlling an inverter 118. The inverter 114 is provided to control an electric current to be supplied from an electric energy storing device 112 such as a battery to the MG 16, or an electric current to be generated by the MG 16 to charge the electric energy storing device 112. On the other hand, the inverter 118 is provided to control an electric current to be supplied from the electric energy storing device 112 to the RMG 70 or an electric current to be generated by the RMG 70 to charge the electric energy storing device 112. The hybrid control device 104 selects one of a plurality of operating modes of the vehicle indicated in FIG. 5, on the basis of the selected operating position $P_{SH}$ of the shift lever 90, the operating amount $A_{CC}$ of the accelerator pedal 122, the vehicle running speed V and an amount of electric energy SOC stored in the electric energy storing device 112. Further, the hybrid control device 104 selects a regenerative braking mode or an engine braking mode, on the basis of the operating amount $A_{CC}$ of the accelerator pedal 122 and an operating amount $B_F$ of a brake pedal 124. In the regenerative braking mode, the MG 16 or RMG 70 is operated as an electric generator by a kinetic energy of the running vehicle, to generate an electric energy and to apply a regenerative brake to the running vehicle. In the engine braking mode, the engine 14 is driven by the kinetic energy of the running vehicle so as to apply an engine brake to the running vehicle.

When the shift lever 90 is placed in the operating position B or D for starting the vehicle with a comparatively small load or while the vehicle is running at a constant speed, the hybrid control device 104 selects a MOTOR DRIVE mode, and this mode is established by engaging the first clutch C1 and releasing the second clutch C2 and the brake B1. In this MOTOR DRIVE mode, the vehicle is driven primarily by the MG 16. When the residual electric energy amount SOC stored in the electric energy storing device 112 is reduced below a predetermined lower limit or when the engine 14 is started for increasing the vehicle drive force while the vehicle is driven in the MOTOR DRIVE mode, the hybrid control device 104 selects an ETC mode or a DIRECT mode which will be described, so that the vehicle running is continued in the same state while the MG 16 or RMG 70 is driven by a kinetic energy of the vehicle so as to charge the electric energy storing device 112.

The DIRECT mode is selected while the vehicle is driven with an intermediate or a comparatively large load. The DIRECT mode is established by engaging the first and second clutches C1 and C2 and releasing the brake B1. In this DIRECT mode, the rotary elements of the planetary gear device 18 are rotated as a unit, and the vehicle is driven primarily by the engine 14, or by the engine 14 and the MG 16, or primarily by the engine 14 while the MG 16 is driven to charge the electric energy storing device 112. In the DIRECT mode, the rotating speed of the sun gear 24 (namely, the rotating speed $N_E$ of the engine 14), the rotating speed of the carrier 28 (namely, the rotating speed $N_{MG}$ of the MG 16) and the rotating speed of the ring gear 32 (namely, the rotating speed $N_{IN}$ of the input shaft 26 of the continuously variable transmission 20 are equal to each other. In this case, the speeds of the sun gear 24, carrier 28 and ring gear 32 are indicated by a one-dot chain line in a two-dimensional collinear chart of FIG. 6, wherein the speeds of the sun gear 24, carrier 28 and ring gear 32 are represented by respective three vertical axes S, R and C, while the speed ratio of the planetary gear device 18 is represented by a horizontal axis. In the collinear chart of FIG. 6, a distance between the vertical axes S and C corresponds to "1", and a distance between the axes R and C corresponds to the gear ratio p of the planetary gear deice 18 of double-pinion type.

When the vehicle is started, the ETC mode (electric torque converter mode or torque boosting mode) is established by engaging the second clutch C2 and releasing the first clutch C1 and the brake B1. In this ETC mode, the stationary vehicle can be smoothly started with the engine 14 held at a suitable speed, by gradually increasing the amount of electric energy to be generated by the MG 16, that is, the reaction force of the MG 16 (drive torque for operating the MG 16). Where the vehicle and the MG 16 are driven by the engine 14 as in this case, the output torque of the engine 14 is boosted 1/ρ times, for instance, two times where ρ=0.5, and the thus boosted engine torque is transmitted to the continuously variable transmission 14. Where the speed $N_{MG}$ of the MG 16 is represented by point A in the collinear chart of FIG. 6 (namely, a speed of rotation in the reverse direction for generating an electric energy), the input shaft speed $N_{IN}$ of the continuously variable transmission 20 is zero, so that the vehicle is stationary. When the amount of electric energy generated by the MG 16 is increased with a result of an increase of its speed $N_{MG}$ to a value represented by point B, as indicated by broken line in the collinear chart, the input shaft speed $N_{IN}$ of the transmission 20 is accordingly increased, so that the vehicle is started.

When the shift lever 90 is placed in the operating position N or P, the hybrid control device 104 selects one of two NEUTRAL modes, namely, a NON-CHARGING mode and a CHARGING & ENGINE-START mode. In either of these two NEUTRAL modes, the first and second clutches C1, C2 are released. In the NON-CHARGING mode, the brake B1 is also released, the power transmitting path is disconnected n the planetary gear device 18. In the CHARGING & ENGINE-START mode, the brake B1 is engaged. While the NON-CHARGING mode is normally selected, the CHARGING & ENGINE-START mode is selected to start the engine 14 with the MG 16 with the brake B1 placed in the engaged state, if the electric energy amount SOC stored in the electric energy storing device 112 is reduced below the lower limit.

When the shift lever 90 is placed in the operating position R (reverse drive position), for running the vehicle in the reverse direction with a comparatively small load, for example, the hybrid control device 104 selects the MOTOR DRIVE mode, and this mode is established by engaging the first clutch C1 and releasing the second clutch C2 and the brake B1, so that the vehicle is driven in the reverse direction primarily by the MG 16. When the vehicle is driven in the reverse direction with an intermediate or comparatively large load, the hybrid control device 104 selects a FRICTION DRIVE mode, and this mode is established by engaging the first clutch C1 and releasing the second clutch C2 while holding the brake B1 in a slipping state. In the FRICTION DRIVE mode, the output torque of the engine 14 is added to the output torque of the MG 16.

Further, the hybrid control device 104 is adapted to effect a high-μ-road-surface assisting control or a low-μ-road-surface assisting control, as needed. In the high-μ-road-surface assisting control, the RMG 70 is operated to drive the rear wheels 80, 82 to temporarily increase the total vehicle drive force during starting or rapid acceleration of the vehicle by the front drive wheels 66, 68, with a suitable distribution of the front and rear drive forces generated by the respective pairs of front and rear wheels 66, 68, 80, 82. In the low-μ-road-surface assisting control, the RMG 70 is operated to drive the rear wheels 80, 82 while at the same time the front drive force generated by the front wheels 6, 68 is reduced by reducing the speed ratio γ of the continuously variable transmission 20, for instance, for facilitating the starting of the vehicle on a road surface having a relatively low friction coefficient $\mu$ such as a frozen or snow-covered road surface.

The battery control device 106 permits the electric energy storing device 112 (e.g., battery or condenser) to be charged with an electric energy generated by the MG 16 or RMG 70 when the residual electric energy amount SOC stored in the electric energy storing device 112 is reduced below the predetermined lower limit $SOC_D$, and inhibits the charting of the electric energy storing device 112 with the electric energy generated by the MG 16 or RMG 70 when the residual electric energy amount SOC exceeds a predetermined lower limit $SOC_U$. Further, the battery control device 106 inhibits the charging of the electric energy storing device 112 when the expected electric power Pb (an amount of energy expected to be consumed+an amount of energy expected to be stored by charging) exceeds an upper limit $W_{IN}$ of electric power or energy input, and inhibits the discharging of the electric energy storing device 112 when the expected electric power Pb becomes smaller than an upper limit $W_{OUT}$ of electric power or energy output. These upper limits $W_{IN}$ and $W_{OUT}$ change as a function of the temperature $T_B$ of the storing device 112.

The brake control device 108 is adapted to effect a traction control (TRC control), an anti-lock control (ABS control) and a vehicle running stability control (VSC control), for controlling wheels brakes 66WB, 68WB, 80WB and 82WB for braking the respective wheels 66, 68, 80, 82, as needed, through a hydraulic brake control device 125, for the purpose of improving the running stability of the vehicle or increasing the vehicle traction force, during starting, braking and turning of the vehicle on a road surface having a low friction coefficient $\mu$. For effecting those controls, the brake control device 108 calculates, on the basis of the output signals of wheel speed sensors provided for the wheels 66, 68, 80, 82, peripheral speeds of the wheels 66, 68, 80, 82 (vehicle running speed as calculated on the basis of the rotating speeds of the wheels), namely, a front-right-wheel peripheral speed $V_{FR}$, a front-left-wheel peripheral speed $V_{FL}$, a rear-right-wheel speed $V_{RR}$, and a rear-left-wheel speed $V_{RL}$, and an average front-wheel peripheral speed $V_F=(V_{FR}+V_{FL})/2$ and an average rear-wheel peripheral speed $V_R=(V_{RR}+V_{RL})/2$. Further, the brake control device 108 determines a lowest one of the wheel peripheral speeds ($V_{FR}$, $V_{FL}$, $V_{RR}$, $V_{RL}$) as the vehicle speed V, and calculates slip speeds $\Delta V$ of the front drive wheels 66, 68 as a difference between the peripheral speeds $V_{FR}$, $V_{FL}$ and the peripheral speeds of the rear wheels 80, 82 when the rear wheels 80, 82 are not driven by the RMG 70. The TRC control is initiated when the slip speed $\Delta V$ of either one of the front drive wheels 66, 68 exceeds a TRC initiating threshold $\Delta V1$, that is, when at least one of the front drive wheels 66, 68 has an excessive slipping tendency during starting or running of the vehicle with the front drive wheels 66, 68. In the TRC control, the output torque of the engine 14 is reduced by controlling the throttle actuator 21, while at the same time at least one of the wheel brakes 66WB, 68WB for the front wheels 66, 68 is activated, to reduce the drive force generated by the excessively slipping front drive wheel or wheels 66, 68, so that a slip ratio $RS=(\Delta V/V_R) \times 100\%$ of each front drive wheel 66, 68 is reduced to within a desired amount $R_{S1}$.

The ABS control is effected as needed, during brake application to the vehicle, to control the braking force generated by each of the wheel brakes 66WB, 68WB, 80WB, 82WB for the wheels 66, 68, 80, 82, so that the slip ratio of each wheel under braking is held within an optimum range, for assuring high running stability of the vehicle. During turning of the vehicle, the brake control device 108 determines whether the vehicle has an excessive oversteering or understeering tendency (spinning or drift-out tendency), on the basis of the steering angle of the vehicle detected by a steering angle sensor (not show), the yaw rate of the vehicle detected by a yaw rate sensor (not shown), and the longitudinal and lateral acceleration values of the vehicle detected by a 2-axes acceleration sensor (not shown). The VSC control is effected to eliminate the detected oversteering or understeering tendency, by activating appropriate one or ones of the wheel brakes 66WB, 68WB, 80WB, 82WB and controlling the throttle actuator.

Referring next to the block diagram of FIG. 7, there are illustrated functional means of the vehicle control apparatus including the hybrid control device 104. The vehicle control apparatus includes neutral-state determining means 130, neutral-mode determining means 132, first-synchronization control means 140, and second-synchronization determining means 142.

The neutral-state determining means 130 is adapted to determine whether the planetary gear device 18 is placed in its neutral state in which the first and second clutches C1, C2 are both placed in the released state. This determination is made on the basis of an operation of the shift lever 90. Namely, the neutral-state determining means 130 determines that the planetary gear device 18 is placed in the neutral state, when the selected operating position $P_{SH}$ of the shift lever 90 is one of two non-drive positions N (NEUTRAL position) and P (PARKING position). In other words, the planetary gear device 18 is placed in the neutral state when the shift lever 90 is placed in either the position N or P.

The neutral-mode determining means 132 is operable when the neutral-state determining means 132 has determined that the planetary gear device 180 is placed in the neutral state. The neutral-mode determining means 132 determines which one of the first and second clutches C1 and C2 is to be engaged when a driving of the vehicle in any one of drive modes is subsequently initiated. The neutral-mode determining means 132 includes engine-operation determining means 134, first-neutral-state determining means 136, and second-neutral-state determining means 138. The engine-operation determining means 134 is operable when the neutral-state determining means 130 has determined that the planetary gear device 180 is placed in the neutral state. The engine-operation determining means 134 determines whether the engine 14 is in operation.

The first-neutral-state determining means 136 determines that the power transmitting system is placed in a first neutral state, when the engine-operation determining means 134 has determined that the engine 14 is at rest. Where a driving of the vehicle is initiated while the engine 14 is at rest, the vehicle is driven by the MG 16 in either the MOTOR DRIVE mode or the FRICTION DRIVE mode in which the first clutch is placed in the engaged state. In other words, the MOTOR DRIVE or FRICTION DRIVE mode is selected when the power transmitting system is placed in the first neutral state with the engine at rest.

The second-neutral-state determining means 138 determines that the power transmitting system is placed in a second neutral state, when the engine-operation determining means 134 has determined that the engine 14 is in operation. Where a driving of the vehicle is initiated while the engine 14 is in operation, the vehicle is driven by the engine 14 in either the ETC mode or the DIRECT mode in which the second clutch is placed in the engaged state. In other words, the ETC or DIRECT mode is selected when the power transmitting system is placed in the second neutral state with the engine 14 being operated.

The first synchronization control means 140 is operable when the first-neutral-state determining means 136 has determined that the power transmitting system is placed in the first neutral state. The first synchronization control means 140 is adapted to control the speed $N_{MG}$ of the MG 16 on the basis of the rotating direction of the rear drive wheels 80, 82 as represented by an output signal of the RMG 70, such that the rotating speeds of the plurality of friction plates of the first clutch C1 are synchronized with each other. Described more specifically, the friction plates of the first clutch C1 include at least one friction plate connected to the MG 16 through the carrier 28, and at least one friction plate connected to the input shaft 26 of the continuously variable transmission 20. Thus, the first clutch C1 has at least one pair of friction members connected to the carrier 28 and the continuously variable transmission 20, respectively. The speed $N_{IN}$ of the input shaft 26 of the continuously variable transmission 20 is determined as a desired value $N_{MG0}$ of the speed $N_{MG}$ of the MG 16. The first synchronizing means 140 controls the actual speed $N_{MG}$ of the MG 16 such that the actual speed $N_{MG}$ coincides with the desired value $N_{MG0}$. A collinear chart shown in FIG. 8, which is defined by three vertical axes E, R, C and a horizontal axis similar to those of FIG. 6, shows that the speed $N_{MG}$ of the MG 16 is synchronized with the speed $N_{IN}$ of the input shaft 26, by the first synchronizing means 140, when the rear wheels 80, 82 are rotated by the RMG 70 in the forward direction, that is, when the input shaft speed $N_{IN}$ is a positive value.

The second synchronizing means 142 is operable when the second-neutral-state determining means 138 has determined that the power transmitting system is placed in the second neutral state. The second synchronization control means 142 is adapted to control the speed $N_{MG}$ of the MG 16 on the basis of the rotating direction of the rear drive wheels 80, 82 detected by the RMG 70, such that the rotating speeds of the plurality of friction plates of the second clutch C2 are synchronized with each other. Described more specifically, the friction plates of the second clutch C2 include at least one friction plate connected to the input shaft 26, and at least one friction plate connected to the ring gear 32 of the planetary gear device 18. Thus, the second clutch C2 includes at least one pair of friction members connected to the ring gear 32 and the continuously variable transmission 20, respectively. The second synchronizing means 142 controls the actual speed $N_{MG}$ of the MG 16 such that the speed $N_R$ of the ring gear 32 coincides with the speed $N_{IN}$ of the input shaft 26.

Collinear charts of FIGS. 9–11 are defined by three vertical axes E, R, C and a horizontal axis similar to those of FIG. 6 or 8. The collinear chart of FIG. 9 shows that the speed $N_R$ of the ring gear 32 is synchronized with the speed $N_{IN}$ of the input shaft 26, when the power transmitting system is placed in the second neutral state with the engine 14 being operated while the rear wheels 80, 82 are rotated by the RMG 70 in the forward direction. The collinear chart of FIG. 10 shows that the speed $N_R$ is synchronized with the input shaft speed $N_{IN}$ when the power transmitting system is placed in the second neutral state with the engine 14 being operated while the vehicle is stationary. The collinear chart of FIG. 11 shows that the speed $N_R$ is synchronized with the input shaft speed $N_{IN}$ when the power transmitting system is placed in the second neutral state with the engine 14 being operated while the rear wheels 80, 82 are rotated by the RMG 70 in the reverse direction, that is, while the input shaft speed $N_{IN}$ is negative. It will be understood from the collinear charts of FIGS. 9–11 that the speed $N_R$ of the ring gear 32 can be synchronized with the input shaft speed $N_{IN}$ by the second synchronizing means 142, by controlling the actual speed $N_{MG}$ of the MG 16 so as to coincide with the desired value $N_{MG0}$ which is determined according to the following equation (1):

$$(1)\ N_{MG0}=(N_{IN}-\rho N_E)/(1-\rho) \tag{1}$$

A speed sensor (not shown) used for detecting the input shaft speed $N_{IN}$ is adapted to simply generate pulses at a period corresponding to the rotating speed of the input shaft 26. Tat is, the input shaft speed sensor is not able to detect the rotating direction of the input shaft 26. Accordingly, the rotating speed $N_{IN}$ may be detected as a positive value even when the input shaft 26 is actually rotated in the forward direction. The positive value of the input shaft speed $N_{IN}$ is indicated by $N_{IN'}$ represented by a broken line in FIG. 11. $N_{MG0'}$ represented by another broken line in FIG. 11 indicates the desired value of the speed $N_{MG}$ of the MG 16, which value would be calculated on the basis of the positive speed value $N_{IN'}$. If the rotating direction of the input shaft 26 cannot be detected, the friction plates of the second clutch C2 may not be synchronized as required. In the vehicle control apparatus according to the present embodiment, however, the rotating direction of the rear wheels 80, 82 can be correctly detected by a signal generated from the RMG 70, which functions as a resolver to detect the above-indicated rotating direction, while the RMG 70 is not operated to apply a driving torque to the rear wheels 80, 82. The rotating direction of the input shaft 26 is the same as the detected rotating direction of the rear wheels 80, 82. In the present embodiment, the speed $N_{MG}$ of the MG 16 can be correctly controlled such that the speed $N_R$ is made equal to the input shaft speed $N_{IN}$.

Referring next to the flow chart of FIG. 12, there will be described a control routine executed by the hybrid control device 104 to control an operation of the MG 16. This control routine is repeatedly executed with a predetermined cycle time, which is comparatively short (e.g., several tens of milliseconds).

The control routine of FIG. 12 is initiated with step SI corresponding to the neutral-state determining means 130, to determine whether the presently selected operating position $P_{SH}$ of the shift lever 90 is one of the non-drive positions, namely, either the position N or the position P.

If a negative decision (NO) is obtained in step S1, one cycle of execution of the routine is terminated. If an affirmative decision (YES) is obtained in step S1, the control flow goes to steps S2–S4 corresponding to the neutral-mode determining means 132. Step S2 corresponding to the engine-operation determining means 134 is provided to determine whether the engine 14 is in operation. If a negative decision (NO) is obtained in step S2, the control flow goes to step S3 corresponding to the first-neutral-state determining means 136, to determine that the power transmitting system is placed in the first neutral state in which the engine 14 is at rest. If an affirmative decision (YES) is obtained in step S2, the control flow goes to step S4 corresponding to the second-neutral-state determining means 138, to determine that the power transmitting system is placed in the second neutral state in which the engine 14 is in operation.

Where a driving of the vehicle is initiated in the first neutral state, the vehicle is driven in the MOTOR DRIVE mode or FRICTION DRIVE mode with the first clutch C1 placed in the engaged state. Where the first neutral state is detected in step S3, the control flow goes to step S5 corresponding to the first synchronizing means 140, in which the speed $N_{MG}$ of the MG 16 is controlled in a feedback fashion such the speed $N_{MG}$ detected by a suitable sensor (not shown) coincides with the speed value $N_{IN}$ of the input shaft 26 which is determined on the basis of the output signal of the input shaft speed sensor and the rotating direction of the rear wheels 80, 82 represented by the output signal of the RMG 70.

Where a driving of the vehicle is initiated in the second neutral state, the vehicle is driven in the ETC mode or DIRECT mode with the second clutch C2 placed in the engaged state. Where the second neutral state is detected in step S4, the control flow goes to step S6 corresponding to the second synchronizing means 142, in which the desired value $N_{MG0}$ of the speed $N_{MG}$ of the MG 16 that is used for coincidence of the speed $N_R$ of the ring gear 32 with the input shaft speed $N_{IN}$ is calculated according to the above equation (1) and on the basis of the engine speed $N_E$ detected by an engine speed sensor (not shown) and the input shaft speed $N_{IN}$ (detected on the basis of the output signal of the input shaft speed sensor and the rotating speed of the rear wheels 80, 82 detected the RMG 70, as discussed above). Further, the speed $N_{MG}$ of the MG 16 is controlled in a feedback fashion in step S6 such the speed $N_{MG}$ coincides with the desired value $N_{MG0}$.

In the present embodiment which has been described above, the speeds of the friction members in the form of friction plates of the first clutch C1 connected to the MG 16 and the input shaft 26 are synchronized with each other by the first synchronizing means 140 (corresponding to step S5) when the neutral-mode determining means 132 (corresponding to steps S2–S4) has determined that the power transmitting system is placed in the first neutral state in which the engine 14 is at rest. When the driving of the vehicle is initiated in this first neutral state, the first clutch C1 is engaged to establish a drive mode in which the vehicle is driven by the MG 16. When the neutral-mode determining means 132 has determined that the power transmitting system is placed in the second neutral state in which the engine 14 is in operation, on the other hand, the speeds of the friction members of the second clutch C2 connected to the input shaft 26 and the ring gear 32 are synchronized with each other by the second synchronizing means 142 (corresponding to step S6). When the driving of the vehicle is initiated in this second neutral state, the second clutch C2 is engaged to establish a drive mode in which the vehicle is driven by the engine 14. Thus, the present vehicle control apparatus is arranged to synchronize the friction members of the appropriate first or second clutch C1, C2 which is to be engaged to establish a suitable drive mode after the power transmitting system is placed in the appropriate first or second neutral state, so that the operating mode of the vehicle can be rapidly and smoothly switched from the neutral state to the appropriate drive state or mode, with a high operational response and without a shock due to an engaging action of the appropriate clutch C1, C2.

In the present embodiment, the speeds of the rotary elements or friction members of the clutch C1, C2 are synchronized with each other by utilizing a rotary motion of the MG 16, rather than a rotary motion of the engine 14. Accordingly, the synchronization can be effected over a wide range of the operating speed $N_{IN}$ of the input shaft 26 of the continuously variable transmission 20.

Further, the first synchronizing means 140 (corresponding to step S5) and the second synchronizing means 142 (corresponding to step S6) are arranged to effect the synchronization of the speeds of the friction members of the clutch C1 or C2 on the basis of the rotating direction of the rear wheels 80, 82, that is, on the basis of the rotating direction of the input shaft 26. This arrangement permits stable synchronization of the clutch C1, C2 which is to be engaged when the vehicle is subsequently driven in a drive mode, irrespective of whether the vehicle is driven in the forward direction or in the reverse direction.

Further, the neutral-mode determining means 132 (corresponding to steps S2–S4) is arranged to determine whether the power transmitting system is placed in the first or second neutral mode, depending upon whether the engine 24 is in operation or not while the clutches C1 and C2 are placed in the released state. This arrangement assures accurate determination as to whether the power transmitting system is placed in the first or second neutral state.

While one preferred embodiment of this invention has been described above by reference to the accompanying drawings, it is to be understood that the present invention may be otherwise embodied.

In the illustrated embodiment illustrated in the flow chart of FIG. 12, the determination in step S1 as to whether the power transmitting system is placed in the neutral state or not is effected depending upon whether the presently selected position $P_{SH}$ of the shift lever 90 is any one of the non-drive positions N and P. Namely, the determination is effected depending upon whether the vehicle operator desires to place the power transmitting system in the neutral state or not. However, the step S1 may be modified to determine whether the power transmitting system is placed in the neutral state which may be automatically selected by the hybrid control device 104 or manually selected by the vehicle operator through the shift lever 90. For instance, the power transmitting system is automatically brought to the neutral state in an anti-lock braking pressure control by the hydraulic brake control device 125 under the control of the brake control device 108, while the vehicle is running on a road surface having a low friction coefficient, so that the anti-lock braking pressure control does not deteriorate the driving comfort. In this case, too, the affirmative decision may be obtained in step S1.

In the illustrated embodiment, the front wheels 66, 68 are driven by the main drive device 10 including the engine 14 and the MG 16, while the rear wheels 80, 82 are driven by the auxiliary drive device 12 including the RMG 70. However, the front wheels 66, 68 may be driven by the auxiliary drive device 12, while the rear wheels 80, 82 may be driven by the main drive device 10. Further, the auxiliary drive device 12 may be eliminated.

It is to be understood that the present invention may be embodied with various other changes, modifications and improvements, which may occur to those skilled in the art, without departing from the spirit and scope of the invention defined in the following claims.

What is claimed is:

1. A vehicle control apparatus for controlling a hybrid vehicle of a type which comprises a first drive power source, a second drive power source, and a power transmitting system including a transmission and a planetary gear device having a first rotary element connected to said first drive power source, a second rotary element connected to said second drive power source and further connected to said transmission through a first clutch, and a third rotary element connected to said transmission through a second clutch, said first clutch including one pair of friction members connected to said first rotary member and said transmission, respectively, said second clutch including one pair of friction members connected to said third rotary element and said transmission, respectively, said vehicle control apparatus further comprising:

neutral-mode determining means operable when said first and second clutches are both placed in a released state, for determining whether said power transmitting system is placed in a first neutral state or a second neutral state, depending upon which one of said first and second clutches is to be engaged when a driving of said hybrid vehicle in a vehicle drive mode is subsequently initiated;

first synchronizing means operable when said neutral-mode determining means has determined that the power transmitting system is placed in said first neutral state, for synchronizing speeds of said one pair of friction members of said first clutch with each other; and second synchronizing means operable when said neutral-mode determining means has determined that the power transmitting system is placed in said second neutral state, for synchronizing speeds of said one pair of friction members of said second clutch with each other.

2. A vehicle control apparatus according to claim 1, wherein said first synchronizing means synchronizes the speeds of said one pair of friction members of said first clutch, by controlling an operating speed of said second drive power source.

3. A vehicle control apparatus according to claim 1, wherein said second synchronizing means synchronizes the speeds of said one pair of friction members of said second clutch, by controlling an operating speed of said second drive power source.

4. A vehicle control apparatus according to claim 1, wherein the hybrid vehicle has a front wheel and a rear wheel, and further comprises a third drive power source, and wherein one of said front and rear wheels is connected to said first drive power source and said second drive power source through said transmission, and the other of said front and rear wheels is connected to said third drive power source, said third drive power source, said third drive power source generating a signal representative of a rotating direction of said other wheel, while said third drive power source is not operated to apply a driving torque to said other wheel, said first synchronizing means synchronizing the speeds of said one pair of friction members of said first clutch, on the basis of the rotating direction of said other wheel represented by said signal.

5. A vehicle control apparatus according to claim 1, wherein the hybrid vehicle has a front wheel and a rear wheel, and further comprises a third drive power source, and wherein one of said front and rear wheels is connected to said first drive power source and said second drive power source through said transmission, and the other of said front and rear wheels is connected to said third drive power source, said third drive power source generating a signal representative of a rotating direction of said other wheel, while said third drive power source is not operated to apply a driving torque to said other wheel, said second synchronizing means synchronizing the speeds of said one pair of friction members of said second clutch, on the basis of the rotating direction of said other wheel represented by said signal.

6. A vehicle control apparatus according to claim 1, wherein a drive force generated by said second drive power source is transmitted to said transmission through said first clutch placed in its engaged state, during the driving of said hybrid vehicle in said vehicle drive mode when said driving in said vehicle drive mode is initiated while said first drive power source is at rest, and a drive force generated by said first drive power source is transmitted to said transmission through said second clutch placed in its engaged state, during the driving of said hybrid vehicle in said vehicle drive mode when said driving in said vehicle drive mode is initiated while said first drive power source is in operation, said neutral-mode determining means includes:

operation determining means for determining whether said first drive power source is in operation or at rest;

first-neutral-state determining means for determining that said power transmitting system is placed in said first neutral state, when said operation determining means has determined that said first drive power source is at rest; and second-neutral-state determining means for determining that said power transmitting system is placed in said second neutral state, when said operation determining means has determined that said first drive power source is in operation.

7. A vehicle control apparatus according to claim 6, wherein the hybrid vehicle has an operator-controlled member having a least one vehicle-drive position in which the hybrid vehicle is driven by at least one of said first drive power source and said second drive power source, and at least one non-vehicle-drive position in which said first and second clutches are placed in said released state and the hybrid vehicle is driven by none of said first drive power source and said second drive power source, said neutral-mode determining means being operable when said operator-controlled member is placed in said non-vehicle-drive position.

8. A vehicle control apparatus according to claim 1, wherein said first drive power source is an internal combustion engine, and said second drive power source is a motor/generator.

9. A vehicle control apparatus according to claim 4, wherein said first drive power source is an internal combustion engine, and said second and third drive power sources are a first motor/generator and a second motor/generator, respectively.

10. A vehicle control apparatus according to claim 5, wherein said first drive power source is an internal combustion engine, and said second and third drive power sources are a first motor/generator and a second motor/generator, respectively.

\* \* \* \* \*